United States Patent
Hueppchen et al.

(10) Patent No.: US 7,845,500 B2
(45) Date of Patent: Dec. 7, 2010

(54) OIL FILTER UNIT

(75) Inventors: Claudia Hueppchen, Stuttgart (DE); Josef Rohrmeier, Laberweinting (DE); Dieter Amesoeder, Bietigheim-Bissingen (DE); Sven Epli, Neckarsulm (DE); Aude Nicolas, Weiler (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/340,509

(22) Filed: Jan. 27, 2006

(65) Prior Publication Data

US 2006/0180541 A1    Aug. 17, 2006

(30) Foreign Application Priority Data

Jan. 28, 2005   (DE) .............. 10 2005 004 287

(51) Int. Cl.
*B01D 35/147* (2006.01)
*B01D 35/30* (2006.01)
*B01D 29/07* (2006.01)
*B01D 35/00* (2006.01)

(52) U.S. Cl. .............. 210/455; 210/130; 210/445; 210/495; 210/451; 210/453

(58) Field of Classification Search .............. None
See application file for complete search history.

(56) References Cited

U.S. PATENT DOCUMENTS

| | | | | |
|---|---|---|---|---|
| 4,601,820 A | * | 7/1986 | Leason ............... | 210/94 |
| 5,049,274 A | * | 9/1991 | Leason et al. ....... | 210/445 |
| 5,292,432 A | | 3/1994 | Jainek et al. | |
| 5,599,448 A | * | 2/1997 | Spearman .......... | 210/445 |
| 5,766,455 A | * | 6/1998 | Berman et al. ..... | 210/493.1 |
| 5,885,455 A | * | 3/1999 | Graus et al. ........ | 210/493.1 |
| 6,113,784 A | * | 9/2000 | Stoyell et al. ...... | 210/493.2 |
| 6,432,307 B2 | * | 8/2002 | Gizowski et al. ... | 210/321.6 |
| 6,508,932 B1 | * | 1/2003 | Mueller et al. ..... | 210/130 |
| 6,539,912 B1 | | 4/2003 | Beer | |
| 6,568,540 B1 | * | 5/2003 | Holzmann et al. .. | 210/445 |
| 6,582,593 B2 | * | 6/2003 | Wolford et al. .... | 210/455 |
| 6,800,194 B1 | * | 10/2004 | Stamey et al. ...... | 210/96.1 |
| 7,128,218 B2 | * | 10/2006 | Rosendahl et al. .. | 210/455 |

(Continued)

FOREIGN PATENT DOCUMENTS

DE    42 40 656 A1    7/1993

(Continued)

OTHER PUBLICATIONS

Translation of EP 0526678A1 from epo online.*

(Continued)

*Primary Examiner*—Krishnan S Menon
*Assistant Examiner*—Madeline Gonzalez

(57) ABSTRACT

An oil filter unit for arrangement in the oil sump of an oil circuit, particularly in an automatic transmission. The oil filter unit has a multi-part filter housing with a filter chamber disposed therein such that an oil inlet and an oil outlet communicate with the filter chamber. A filter element is sealingly mounted in the housing between the oil inlet and the oil outlet. The filter element has a pleated filter medium, which is sealingly enclosed by a frame, and the frame has seal contours designed to cooperate with the contours of the filter housing.

11 Claims, 4 Drawing Sheets

U.S. PATENT DOCUMENTS

2002/0121473 A1  9/2002  Boast et al.
2003/0094405 A1  5/2003  Stamey, Jr. et al.
2004/0007520 A1  1/2004  Rosendahl et al.

FOREIGN PATENT DOCUMENTS

EP       0526678 A1 *  2/1993
GB       2 374 298      10/2002

OTHER PUBLICATIONS

European Search Report dated Mar. 31, 2006 including English translation of the pertinent portions (Six (6) pages).

\* cited by examiner

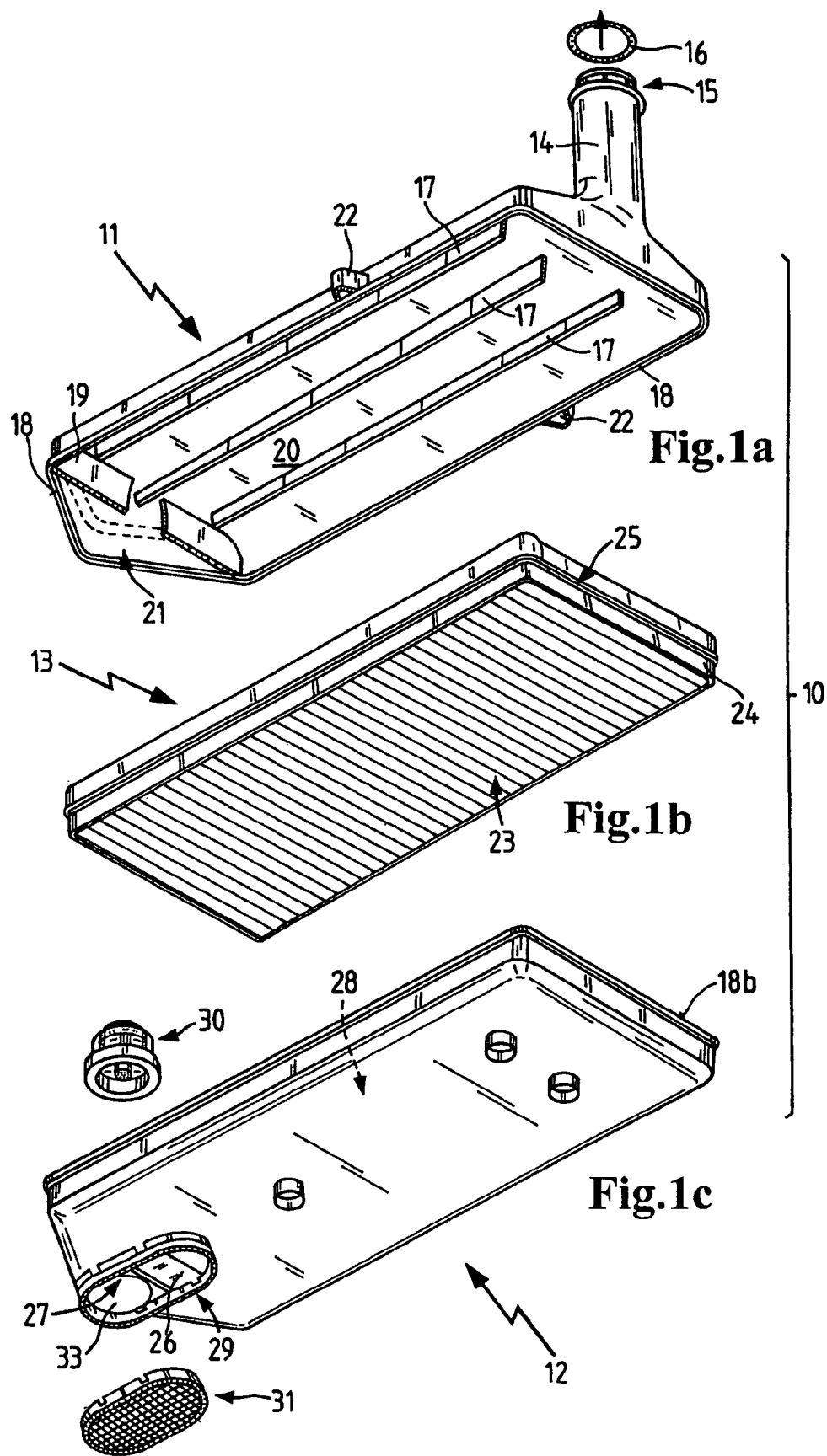

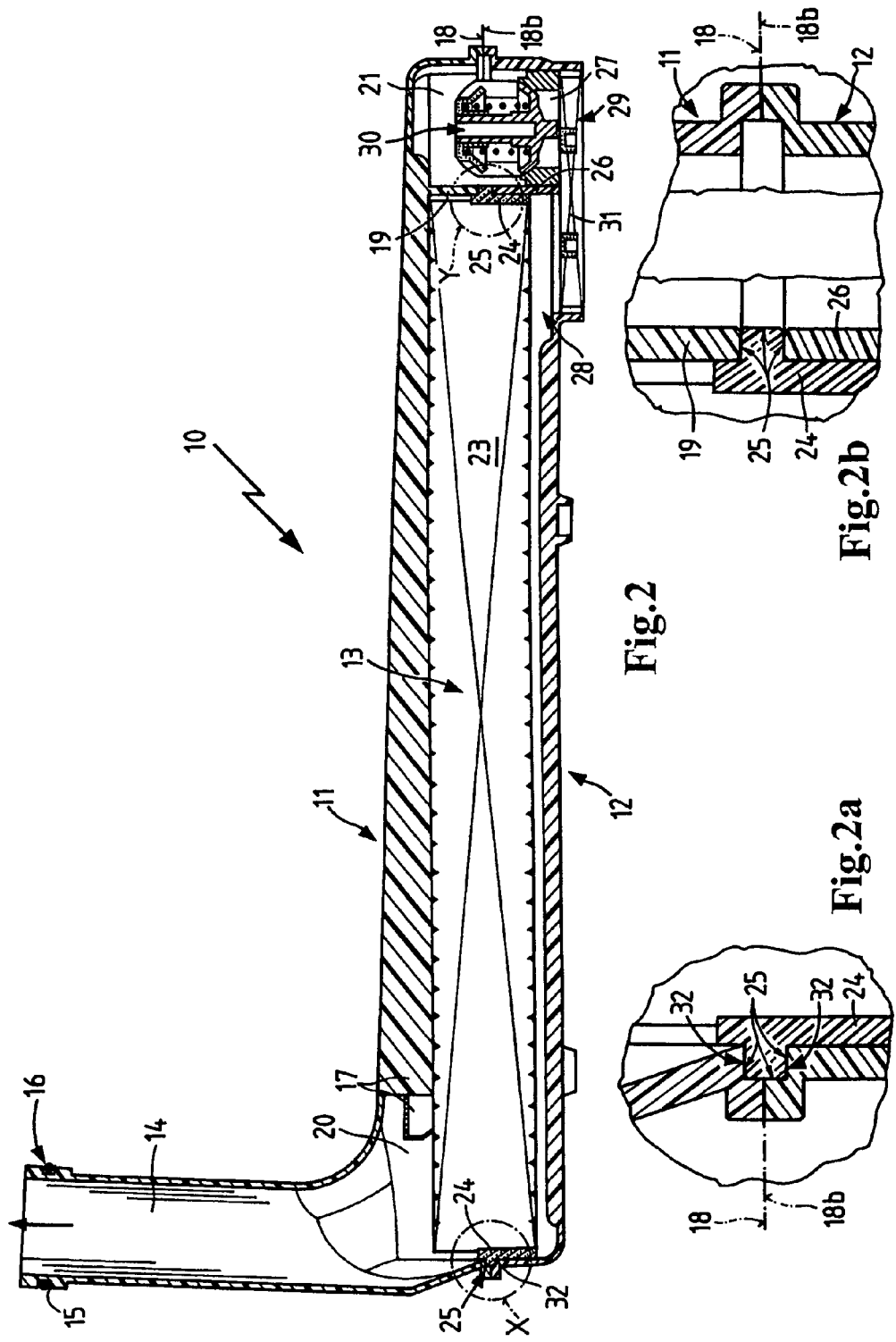

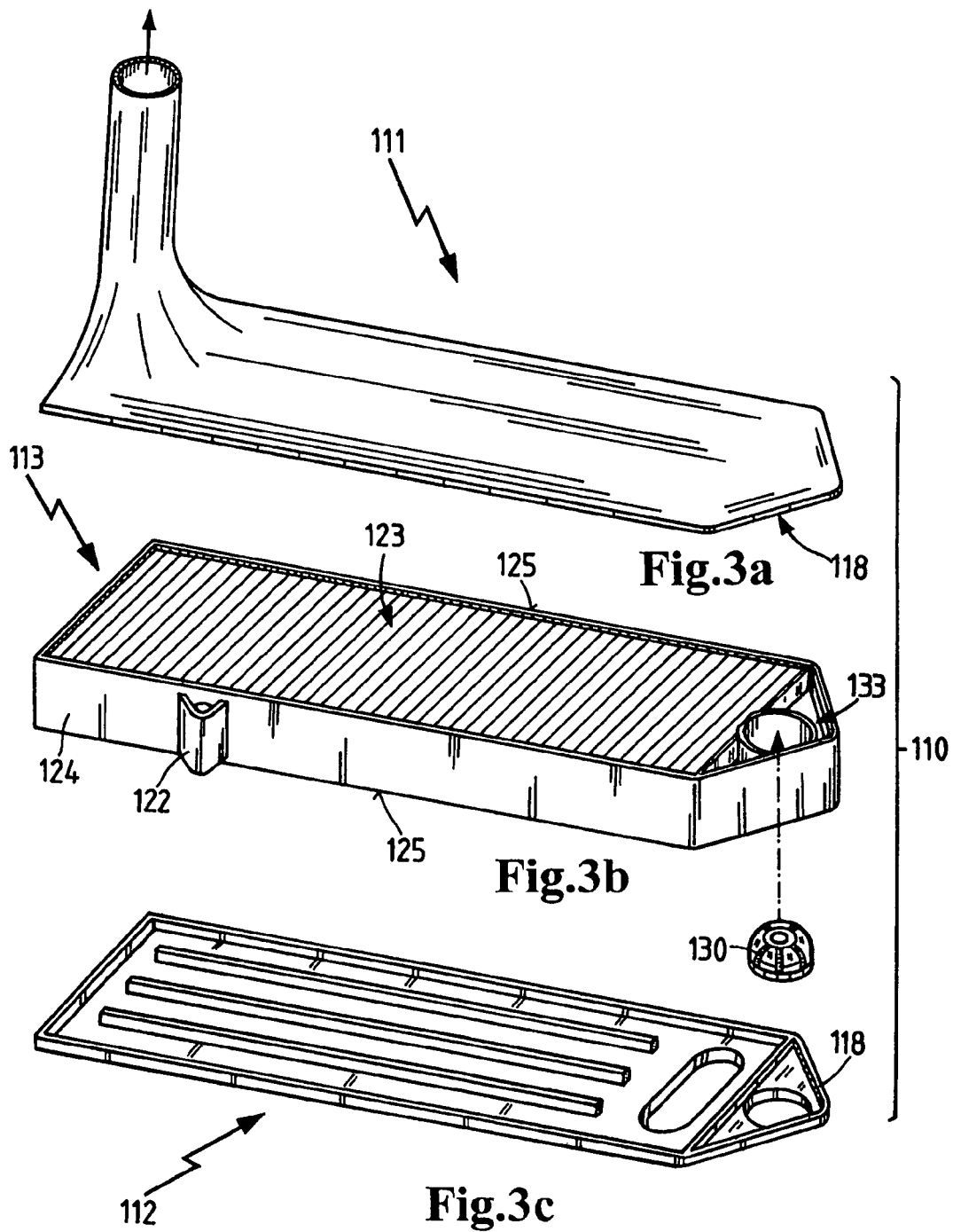

OIL FILTER UNIT

BACKGROUND OF THE INVENTION

The present invention relates to an oil filter unit, which is disposed in an oil collection chamber, such as an oil pan or a housing. Oil filter units of this type are used, for example, to filter the lubricating oil of gears, e.g., automatic transmissions. To adapt the filter unit to the space available for installation, it is designed in the shape of a pan and can be positioned directly within the oil sump. The purpose is to separate impurities from the lubricating oil and thereby to increase the life of the lubricating oil and minimize the wear of the unit to be lubricated. The oil filter unit should have the greatest possible filter fineness and minimum flow resistance and at the same time adequate dirt holding capacity and, in motor vehicles with automatic transmissions, should be designed to last for the life of the vehicle.

Published US patent application no. US 2002/0121473 A1 (=EP 1,238,693) discloses an oil filter assembly having a filter chamber in a pan-shaped housing, which communicates with an oil inlet and an oil outlet. A replaceable filter element supported by ribs is disposed inside the filter chamber. The hollow filter element is spatially substantially parallel to the filter chamber, such that the fluid flows from the outside toward the inside.

A disadvantage of this design is that because of its replaceability, the replaceable filter element must have a complex seal relative to the housing at its opposite end faces. This seal requires corresponding contours on the filter element and the housing, which enable a releasable yet fluid-tight connection. Producing these contours places high demands on the manufacturing process. Furthermore, the size of the filter surface depends directly on the circumference of the filter chamber, which implies a substantial restriction with regard to the adjustment between dirt holding capacity and filter fineness. Because of this restriction, the described oil filter assembly cannot be used with a filter medium that ensures the filter fineness required for the operation of automatic transmissions. Use of such a filter medium would exceed the pressure differential required in suction operation. To meet this requirement in practice, a coarse particle filter is used on the inlet side and an additional fine particle filter downstream of the coarse filter is used on the pressure side.

SUMMARY OF THE INVENTION

It is therefore an object of the invention to provide an improved oil filter unit suitable for filtering the fluid of a motor vehicle transmission.

A further object of the invention is to provide an oil filter unit which has a both a high filter fineness and a high dirt holding capacity.

Another object of the invention is to provide an oil filter unit which has a long service life and can be designed for the life of a motor vehicle transmission.

Yet another object of the invention is to provide an oil filter unit which has a low pressure loss and is simple and economical to manufacture.

It is also an object of the invention to provide an oil filter unit which assures a reliable seal between the filter element and its housing.

These and other objects have been achieved in accordance with the present invention by providing an oil filter unit for arrangement in an oil sump of an oil circuit, the filter unit comprising an at least two-part filter housing having a filter chamber therein; an oil inlet and an oil outlet in communication with the filter chamber, and a filter element sealingly arranged in the housing between the oil inlet and the oil outlet; the filter element comprising a pleated filter medium sealingly enclosed by a frame, and the frame having seal contours configured to sealingly engage with contours of the filter housing.

The oil filter unit according to the invention aims to use a filter medium that makes maximum use of the space available within a filter chamber and forms the largest possible filter surface. This is achieved by using a zigzag-type pleated filter medium. Because of the flat, pan-shaped installation space, a flat pleated filter medium is preferred. To seal the filter medium relative to a housing, the filter medium is enclosed by a frame having seal contours that correspond to the housing or the seal contours of the housing. The frame is made of plastic, for example, such as polyamide or polypropylene, and is injection-molded directly around the filter medium. The injection molded seal contour may, for example, comprise a rib for engagement with a groove formed in the housing. The connection between the filter medium and the frame may, for example, be produced by adhesive bonding, joining or welding, particularly vibration welding. The frame or the seal contour may also be made of polyurethane foam or some other elastomer known in the art. A flat filter element of this type is inserted into the housing in longitudinal direction and divides the housing into a lower unfiltered liquid side and an upper filtered liquid side. On the unfiltered side of the housing, at least one oil inlet is disposed through which the oil from the oil sump flows into the housing. On the filtered side of the housing, an oil outlet is disposed through which the filtered oil is discharged, preferably through an outlet fitting which is fabricated as an integral part of the housing.

The filter element can be inserted into the housing through an installation opening formed in one end face. In this case, a cover may be disposed on the frame to seal the installation opening. The mounting may be releasable, e.g., by snap-in connections, or permanent, by welding or adhesive bonding. To support the seal function, additional seal elements, such as elastomers, may be disposed on the cooperating seal contours between the cover and the housing and/or also between the frame and the housing.

An advantage of the invention is that it substantially enlarges the dirt holding capacity while reducing the differential pressure of the filter medium and keeping the installation space identical. This ensures adequate dirt holding capacity for the coarse and fine particles that occur, so that no additional oil filter is necessary. The use of a frame that is firmly connected with the filter medium ensures a seal between the filter element and the housing which is simple and economical to produce. Because of the large filter surface, the pressure loss is low, such that the filter can be disposed on the inlet side and it is unnecessary to have a fine filter on the pressure side.

In accordance with one advantageous embodiment of the invention, the filter medium is made of a fully synthetic nonwoven material or of glass fibers. Fully synthetic nonwoven materials are well suited for a comparatively coarse filtration fineness. If finer particles need to be filtered, glass fiber media may be used. High demands with regard to filter fineness can be met by using either glass fiber or nonwoven media. Because of the high melting point of the media, the filter frame can be injection molded around them without problems. As a result, an oil filter with a high degree of filter fineness can be simply and economically manufactured, and a highly effective filtration capacity is assured.

In a further advantageous embodiment, the use of glass fiber media enables a filter fineness with a pore size of less than 25 μm. The resulting filter fineness makes it possible to further increase the filtration capacity without an additional filter unit.

In yet another advantageous embodiment, the filter medium is stabilized against the flow pressure by adding a support grid on the inflow and/or the outflow side. This support grid directly contacts the inflow and/or outflow side of the filter medium and extends parallel to the zigzag pleats. The purpose of the support grid is to mechanically stabilize the filter medium against the inflow pressure of the oil and to prevent any fiber particles from being flushed out of the medium. The support grid can furthermore stabilize the fold geometry of the filter medium or can itself form the fold geometry. The material used for the support grid is preferably metal, but a thermostable synthetic resin or a stable spun-bound material may also be used. On the lateral faces of the medium, the grid mesh may be injection molded into the frame to ensure reliable mounting.

The support grid is a simple and reliable way to impart mechanical stability to the filter medium, such that the medium itself requires little stability, can be suitably designed and economically manufactured.

In accordance with yet another advantageous embodiment, the housing is made of two shells, such that a parting plane extends in a longitudinal direction of the filter housing between an upper shell and a lower shell. The parting plane preferably separates the housing along a horizontal plane and surrounds the filter medium completely. Thus, laterally reversed parting surfaces exist on the upper and lower shell. In the assembled state, the seal contours of the frame cooperate with the parting surfaces and are sealingly connected by the parting surfaces. The seal contours of the frame can thus be disposed in the parting plane. To stabilize this connection, the housing walls may be reinforced or expanded in width by forming a bead along the parting surfaces. The parting surfaces may be clamped together, for example by screws or clip connections, to create a compression force with the seal contours of the element. The seal contour may extend sandwich-style across the entire area of the separation face or may be integrated in a stepped seal profile formed by the parting surfaces.

The parting plane is situated in the largest circumferential area of the housing, such that the two housing shells may be advantageously fabricated without undercuts. As a result, all components can be manufactured simply and economically and assembly is reliable and controlled.

In one embodiment, the joint of the seal contour of the frame is non-releasable. The seal contours of the frame may for example be bonded or welded together with the parting surfaces of the shells. These joining methods eliminate the need for additional fasteners and the space required for such fasteners. Taking into account vibration and temperature loads, this embodiment represents a very cost-effective and reliable joint.

In one specific embodiment of the invention, a bypass valve is provided between the unfiltered liquid side and the filtered liquid side of the filter. Valves of this type typically comprise a valve body, a valve seat, a spring and a cage. The preferably spring-loaded valve opens a flow cross section between the unfiltered side and the filtered side, for example, at a defined pressure differential of 0.4 bar. This situation may occur if the oil to be filtered is still highly viscous because of low temperatures or if the flow resistance of the filter medium is increased because of inflowing particulate matter. The space required to install the bypass valve is preferably accommodated in the parting plane. To this end, the parting plane is extended beyond a filter medium region to form a valve space.

In the valve space, the unfiltered side is separated from the filtered side by the frame, ensuring a communicating connection of the bypass valve in the direction of flow. The bypass valve can be inserted into the frame as a separate unit. On the other hand, a valve seat may be integrated into the frame and the additional valve components added prior to assembly.

The bypass valve has the advantage that the oil supply is ensured even if the flow resistance of the filter element is elevated. By disposing the bypass valve in the parting plane, it can be simply and economically integrated into the oil filter unit and requires a minimum of space.

A further advantageous embodiment is equipped with an anti-drain element. This element prevents the oil filter unit from emptying upon shutdown and ensures an immediate oil supply when the transmission is restarted. Anti-drain elements of this type are preferably constructed of a thin-walled metal, plastic or elastomer plate, which seals a valve seat radially or axially in a flow direction. To retain the entire amount of oil within the oil filter unit as far as possible, the anti-drain element may be disposed directly on the oil inlet.

The anti-drain element also advantageously ensures rapid oil supply of the oil filter unit after shutdown and may be integrated into the lower shell, the upper shell or the frame, so that it requires little space.

It is further advantageous to arrange a prefilter directly on the oil inlet, which keeps coarse particulate matter out of the oil filter unit. This prefilter is preferably constructed of a single-layer screen mesh with a mesh size of approximately 0.4 mm to 0.8 mm. To protect both the oil inlet and a bypass valve as described above from coarse particulate matter by using a single prefilter, the oil inlet may be positioned directly adjacent the valve space for the bypass valve. The prefilter may also be disposed on the bypass valve, so that it protects only the bypass valve and thereby prevents a completely unfiltered inflow of particulate matter into the oil circuit when the bypass valve is open. To secure the prefilter, it may, for example, be adhesively bonded, clipped, screwed or welded or injection molded onto or into the unit in the form of an insert.

In accordance with yet another advantageous embodiment of the invention, the frame extends across a given distance between the upper and lower shell of the oil filter unit and thereby forms a part of the housing wall of the filter housing. The frame may also protrude above the height of the filter medium. This creates a flexible clearance on the frame sides facing the shells, which may be used for fastening contours. These contours may be used to fasten the oil filter unit in an installation structure or to fasten the upper and/or lower shell to the frame. For example, contours for vibration welding or butt-welding with heat reflectors may be disposed on the frame. The clearance required for vibration welding may also be taken into account.

Because of the height of the frame, other functional components, such as the bypass valve, an anti-drain element or a prefilter may be integrated into the frame or manufactured integrally with the frame. Depending on the requirements, the frame may also be constructed as a two-part component which is made from different materials. This frame advantageously makes it possible to integrate essential functional elements and to produce the joint between the shells in a reliable and economically efficient manner.

In accordance with yet another advantageous embodiment, contours are provided for mounting the oil filter unit in an installation space of the transmission. These contours may comprise flat webs, eyelet-shaped protuberances, pins, clip-type hooks or other forms of fasteners known in the art. The fastening contours may be disposed on the lower shell, the upper shell or in the parting plane. Since the wall thickness in the region of the parting plane is preferably reinforced and may be further reinforced by the seal contour of the filter element, this region is particularly suitable for disposing fastening contours. These contours preferably cooperate with fastening elements of the transmission housing and secure the position of the oil filter unit.

It is particularly advantageous that the mounting of the oil filter unit can be optimally adjusted to the installation space and the installation process, so that assembly and affixation are made particularly convenient and economical.

In a further refinement of the invention, contours for connecting an intake flange of an oil pump are disposed on the oil outlet. The filtered oil preferably flows to an oil pump through an oil outlet fitting disposed on the upper shell. The oil outlet fitting is provided with contours for connection to a flange of the oil pump. These contours may for example comprise an annular collar, an annular groove, a latching contour or any other fastening contour for pipe fitting known in the art. This has the advantage that the entire oil filter unit may be adjusted to the installation situation to minimize the complexity of the connection to the oil pump.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which:

FIGS. 1a to 1c are an exploded view of an oil filter unit according to the invention;

FIG. 2 is a sectional view of an assembled oil filter unit;

FIGS. 2a and 2b are enlarged detail views of regions X and Y of FIG. 2;

FIGS. 3a to 3c are an exploded view of another variant of the oil filter unit of the invention.

DETAILED DESCRIPTION OF PREFERRED EMBODIMENTS

Figure 4A:
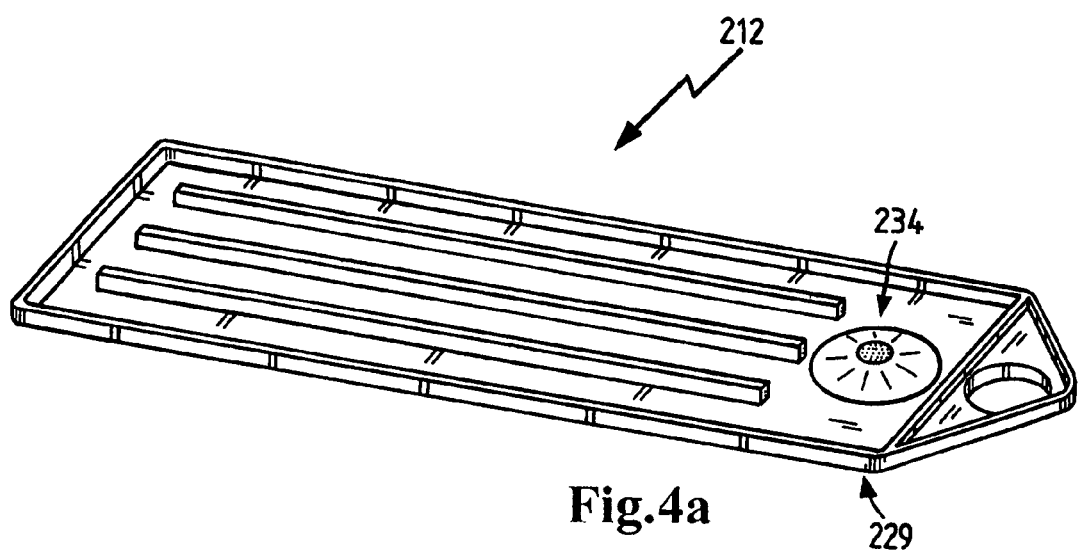
FIGS. 4a and 4b are perspective views of an alternative embodiment of the oil filter unit of the invention.

FIGS. 1a to 1c show an exploded view of an oil filter unit 10 with the individual components disposed in assembly direction. Between an upper shell 11 shown in FIG. 1a and a lower shell 12 shown in FIG. 1c is disposed a filter element 13 depicted in FIG. 1b. A bypass valve 30 and a prefilter 31 are connected to the lower shell 12 when the unit is assembled (FIG. 2).

The upper shell 11 forms one housing section of the two-part housing. On the upper side, it has a tubular oil outlet fitting 14, on the discharge end of which there is a radial groove 15 to receive an O-ring 16. In longitudinal direction of the upper shell 11, on the lower side facing the filter element 13, fins 17 are formed which stiffen the upper shell 11 and form a support for the filter element 13 as illustrated in the assembled state shown in FIG. 2. The lower pan-shaped opening of the upper shell 11 is enclosed by the flat parting surface 18 along its entire periphery. Within the upper shell 11, a support wall 19 is disposed, which separates a first, unfiltered liquid side 20 from a second, filtered liquid side 21.

The filter element 13 comprises a flat filter medium 23 enclosed along its lateral faces by a frame 24. The filter medium 23 is pleated in zigzag fashion, such that the end face edges of the pleats are completely covered by the frame 24. The longitudinal sides of the pleats are also sealingly fastened to the frame 24, so that the entire periphery of the filter medium 23 is sealingly mounted inside the frame 24. The frame 24 also has a stepped seal contour 25 around its entire periphery.

The lower shell 12 has a parting surface 18b mirroring the parting surface 18 of the upper shell. The lower shell 12 forms an unfiltered liquid chamber 28 which is separated from a valve space 27 by a transverse partition 26. A cylindrical valve flange 33 communicating with the valve space 27 is provided to receive the bypass valve 30. The oil inlet 29 molded onto the underside forms an oval contour disposed in the region of the partition 26 and thus communicates with the unfiltered space 28 and the valve space 27. The prefilter 31 shown below the oil inlet 29 communicates with the oil inlet 29 through its circumferential contour and retains coarse particulate matter when installed. Mounting contours 22 disposed laterally on the upper shell 11 are used to secure the oil filter element 10 in an installation space.

FIGS. 2, 2a and 2b show the assembled oil filter unit 10 with the filter element 13 sealingly enclosed between the upper shell 11 and the lower shell 12. FIG. 2a shows a detail X of FIG. 2, and FIG. 2b shows a detail Y of FIG. 2. The seal contours 25 of the frame 24 are inserted between the parting surfaces 18 and 18b, which have seal shoulders 32 engaging the seal contours 25.

Between the unfiltered liquid 28 and the second, filtered liquid side 21 there is a partition 26 which separates the unfiltered liquid space 28 from the second, filtered liquid side 21 via the seal contour 25 of the filter element 13. The end face of the partition 26 is in the same plane as the parting surfaces 18 and 18b. The joint between the parting surfaces 18 and 18b and between the shoulders 32 and the seal contour 25 may be adhesively bonded or welded, for example. As an alternative, the seal contour 25 may also be formed over the entire area of the parting surfaces 18 and 18b, so that the shoulders 32 can be eliminated and the seal contour 25 lies sandwich-style between flat parting surfaces 18 and 18b.

A valve space 27 which is separate from the filter element 13 and in which the bypass valve 30 is disposed, is formed in longitudinal direction of the oil filter unit 10. The bypass valve 30 is sealingly enclosed within the valve space 27 and communicates on the bottom side with the oil inlet 29 and on the topside with the second, filtered liquid side 21. Between a first filtered side 20 and the second filtered side 21, a flow-permeable support wall 19 is disposed which only supports the seal contour 25 and allows cross-flow (see FIG. 1).

To tightly seal the oil outlet fitting 14 relative to a connecting contour (not shown), an O-ring 16 is inserted into the radial groove 15.

Oil which enters through the oil inlet 29 is cleaned from coarse particulate matter by the prefilter 31 disposed in the lower shell 12. The oil flows through the filter medium 23, which causes the filter medium to curve in the direction of flow while being supported by the ribs 17. The oil then flows through the oil outlet fitting 14 to an oil pump (not shown). If the filter medium 23 is very dirty or if the oil is too viscous because of low temperatures, the bypass valve 30 opens as a result of the increased pressure differential, so that a supply of oil is assured.

FIGS. 3a to 3c are an exploded view of an oil filter unit 10 with a substantially higher frame 124, which protrudes above the filter medium 123. The figures show the upper shell 111 of FIG. 1a, the lower shell of FIG. 1c, and the filter element 113 of FIG. 1b disposed therebetween. A valve flange 133 is formed on the frame 124 to receive the bypass valve 130. The upper shell 111 and the lower shell 112 are substantially flat and have parting surfaces 118 which cooperate with the seal faces 125 of the frame. The fastening contours 122 are fabricated integrally with the frame 124 and enable central fastening inside an installation structure (not shown).

Figure 4B:
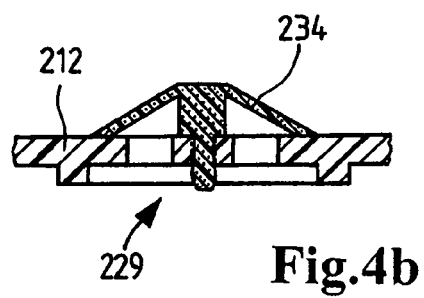

FIGS. 4a and 4b show an embodiment of the lower shell 212 in which a return flow of the oil is prevented. FIG. 4b shows a detail of the region of the oil inlet 29 in a full section of the lower shell 212. In this embodiment, the anti-drain valve 234 is an umbrella valve integrated into the lower shell 212. A suitable material for this purpose is a thermostable and chemical-resistant elastomer, such as silicone.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An oil filter unit for arrangement in an oil sump of an oil circuit, said filter unit comprising:
   an at least two-part filter housing including a first shell and a second shell having a filter chamber therein and seal contours of the housing;
   a support wall provided interior to said first shell, said support wall secured to and extending between opposing walls of said first shell and having an aperture therethrough;
   a traverse partition provided interior to said second shell, said traverse partition secured to and extending between opposing walls of said second shell, said traverse partition positioned to align edge to edge in a common plane with said support wall;
   an oil inlet and an oil outlet in communication with the filter chamber, and
   a filter element sealingly arranged in the housing between the oil inlet and the oil outlet;
   said filter element comprising
      a frame comprising a seal contour around a periphery of the frame configured to sealingly engage with the seal contours of the housing, and
      a flat filter medium pleated in a zigzag manner to form pleats having end face edges and longitudinal sides, wherein the end face edges and longitudinal sides of the pleats are mounted inside of, and are sealingly fastened to and enclosed by, the frame,
   wherein said housing is formed by two shells which form the seal contours thereof and define a parting plane between the two shells, said parting plane aligned with the seal contour around the periphery of the frame,
   wherein the shells are fixedly joined to the seal contour of the frame along the parting plane, and
   wherein a welded connection sealingly engages the seal contour of the frame between the seal contours of the housing, the seal contour of the frame being sandwiched between the seal contours of the housing,
   wherein one end wall of said filter frame has a portion of said seal contour sealably engaging between said support wall and said traverse partition,
   wherein said support wall and said traverse partition define a fluid bypass chamber enclosed in said filter housing at a side of said traverse partition opposite said filter element,
   wherein said fluid bypass chamber is in communication with an outlet side of said filter element through said support wall aperture.

2. An oil filter unit according to claim 1, wherein said filter medium is made of glass fibers or of a fully synthetic non-woven web.

3. An oil filter unit according to claim 2, wherein said filter medium is a glass fiber medium having a filter pore size of less than 25 mm.

4. An oil filter unit according to claim 1, wherein the filter medium is reinforced on the upstream side by a support grid.

5. An oil filter unit according to claim 1, wherein the filter medium is reinforced on the downstream side by a support grid.

6. An oil filter unit according to claim 1, further comprising a bypass valve arranged between the oil inlet and the oil outlet for bypassing the filter element.

7. An oil filter unit according to claim 1, further comprising an anti-drain element disposed in the region of the oil inlet.

8. An oil filter unit according to claim 1, further comprising a prefilter disposed on the oil inlet.

9. An oil filter unit according to claim 1, wherein the frame extends above the height of the filter element and forms a part of the filter housing.

10. An oil filter unit according to claim 1, wherein attachment contours are provided on the filter housing or the frame for mounting the filter housing inside an installation space.

11. An oil filter unit according to claim 1, wherein connecting members for connection to an intake flange of an oil pump are disposed at the oil outlet.

* * * * *